US009565652B2

(12) United States Patent
Park et al.

(10) Patent No.: US 9,565,652 B2
(45) Date of Patent: *Feb. 7, 2017

(54) METHOD AND APPARATUS FOR MONITORING A PAGING MESSAGE IN M2M COMMUNICATIONS

(75) Inventors: Gi Won Park, Gyeonggi-do (KR); Young Soo Yuk, Gyeonggi-do (KR); Jeong Ki Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 77 days.

This patent is subject to a terminal disclaimer.

(21) Appl. No.: 14/007,625

(22) PCT Filed: Apr. 5, 2012

(86) PCT No.: PCT/KR2012/002601
§ 371 (c)(1),
(2), (4) Date: Sep. 25, 2013

(87) PCT Pub. No.: WO2012/138165
PCT Pub. Date: Oct. 11, 2012

(65) Prior Publication Data
US 2014/0022995 A1    Jan. 23, 2014

Related U.S. Application Data

(60) Provisional application No. 61/472,637, filed on Apr. 7, 2011, provisional application No. 61/487,678, filed on May 18, 2011.

(51) Int. Cl.
*H04W 68/02*    (2009.01)
*H04W 4/00*    (2009.01)
*H04W 52/02*    (2009.01)

(52) U.S. Cl.
CPC .............. *H04W 68/02* (2013.01); *H04W 4/005* (2013.01); *H04W 52/0216* (2013.01); *H04W 52/0229* (2013.01); *H04W 68/025* (2013.01)

(58) Field of Classification Search
None
See application file for complete search history.

(56) References Cited

U.S. PATENT DOCUMENTS 5,467,382 A * 11/1995 Schorman ...................... 455/410
5,963,846 A * 10/1999 Kurby ........................... 455/12.1
(Continued)

FOREIGN PATENT DOCUMENTS

CN          101663910 A        3/2010
KR    10-2004-0093952 A       11/2004
(Continued)

*Primary Examiner* — Bunjob Jaroenchonwanit
(74) *Attorney, Agent, or Firm* — Dentons US LLP (57) ABSTRACT

Provided are a method and an apparatus for monitoring a paging message in machine-to-machine (M2M) communications. An M2M device receives a paging setup for initiating an idle mode from a base station. The paging setup includes information indicating a paging cycle, a first paging offset, and a second paging offset. In the idle mode, the M2M device monitors the transmission of a paging message at the first paging offset of the paging cycle. If the paging message is not received at the first paging offset, the M2M device monitors the transmission of the paging message at the second paging offset of the paging cycle.

17 Claims, 7 Drawing Sheets

(56) References Cited

U.S. PATENT DOCUMENTS

| | | | |
|---|---|---|---|
| 6,678,258 B1* | 1/2004 | Capurka et al. | 370/328 |
| RE39,870 E* | 10/2007 | Mardirossian | 340/7.29 |
| 7,570,963 B2* | 8/2009 | Wang et al. | 455/458 |
| 2003/0081735 A1* | 5/2003 | Emory et al. | 379/1.01 |
| 2006/0025134 A1* | 2/2006 | Cho et al. | 455/435.1 |
| 2007/0270118 A1* | 11/2007 | Subramanian et al. | 455/343.2 |
| 2008/0082990 A1* | 4/2008 | Kong et al. | 719/318 |
| 2008/0119209 A1* | 5/2008 | Upp | 455/458 |
| 2008/0254814 A1* | 10/2008 | Harris et al. | 455/458 |
| 2008/0287145 A1* | 11/2008 | Harris | 455/458 |
| 2009/0111378 A1* | 4/2009 | Sheynman et al. | 455/41.1 |
| 2009/0149185 A1* | 6/2009 | Narasimha | 455/442 |
| 2009/0270114 A1* | 10/2009 | Harris | 455/458 |
| 2010/0004001 A1* | 1/2010 | Tao et al. | 455/456.1 |
| 2010/0069091 A1* | 3/2010 | El-Saidny | 455/456.3 |
| 2010/0110965 A1* | 5/2010 | Kojima | 370/312 |
| 2010/0202429 A1* | 8/2010 | Chin et al. | 370/342 |
| 2010/0255860 A1* | 10/2010 | Ji | 455/458 |
| 2011/0044307 A1* | 2/2011 | Mohanty et al. | 370/338 |
| 2011/0096927 A1* | 4/2011 | Baek et al. | 380/270 |
| 2011/0122809 A1* | 5/2011 | Yun et al. | 370/328 |
| 2011/0275382 A1* | 11/2011 | Hakola et al. | 455/452.2 |
| 2012/0034918 A1* | 2/2012 | Park et al. | 455/435.1 |
| 2012/0076085 A1* | 3/2012 | Chou | 370/329 |
| 2012/0195268 A1* | 8/2012 | Huang et al. | 370/329 |
| 2012/0231828 A1* | 9/2012 | Wang et al. | 455/509 |
| 2012/0252481 A1* | 10/2012 | Anpat et al. | 455/456.1 |
| 2013/0003629 A1* | 1/2013 | Jeong et al. | 370/311 |
| 2014/0003234 A1* | 1/2014 | Chou | H04W 4/005 370/230 |
| 2014/0086122 A1* | 3/2014 | Gupta et al. | 370/311 |
| 2014/0221024 A1* | 8/2014 | Xu et al. | 455/458 |

FOREIGN PATENT DOCUMENTS

| | | |
|---|---|---|
| KR | 10-0885157 B1 | 2/2009 |
| KR | 10-2009-0130373 A | 12/2009 |
| WO | 2010/123273 A2 | 10/2010 |

\* cited by examiner

METHOD AND APPARATUS FOR MONITORING A PAGING MESSAGE IN M2M COMMUNICATIONS

This application is the U.S. National Phase of International Application No. PCT/KR2012/002601 filed on Apr. 5, 2012, which claims priority to U.S. Provisional Application No. 61/472,637, filed Apr. 7, 2011 and U.S. Provisional Application No. 61/487,678, filed May 18, 2011, all of which are hereby incorporated by reference as if fully set forth herein.

BACKGROUND OF THE INVENTION

Field of the Invention

The present invention relates to wireless communication and, more particularly, to a method for monitoring a paging message in Machine-To-Machine (M2M) communication and an apparatus using the same.

Related Art

As Machine-To-Machine (M2M) communication (also called Machine Type Communication (MTC)) is one type of data communication including one or more entities that do not need a human interaction. That is, M2M communication refers to a concept in which a machine apparatus not a terminal used by a person performs communication using an existing wireless communication network. A machine apparatus used in M2M communication can be called an M2M device, and the M2M device is various like a vending machine, a machine for measuring the water level of a dam and the like.

An M2M device has different features from a common terminal. Service optimized for M2M communication can be different from service optimized for human-to-human communication. As compared with current mobile network communication service, M2M communication can be featured in terms of different market scenarios, data communication, low costs and efforts, a potentially very large number of M2M devices, a wide service area, and low traffic per M2M device.

In an idle mode, a terminal awakes only for a specific interval and transmits and receives data in order to reduce battery power. A network re-entry process is a process in which a terminal returns to a connected state with a network in an idle mode.

In an idle mode, a terminal periodically awakes in a paging cycle and monitors whether a paging message is received or not. In M2M communication, a long paging cycle of several hours is taken into consideration depending on the type of application. This means that an M2M device must wait for several hours until a next paging cycle is reached if the M2M device misses a paging message in what paging cycle.

There is a need to monitor a paging message in which the features of M2M communication are taken into consideration.

SUMMARY OF THE INVENTION

The present invention provides a method and apparatus for monitoring a paging message in Machine-To-Machine (M2M) communication.

The present invention also provides a method and apparatus for transmitting a paging message in M2M communication.

In an aspect, a method for monitoring a paging message in machine-to-machine (M2M) communication is provided. The method includes receiving, by a M2M device, a paging configuration to initiate an idle mode from a base station, the paging configuration includes information indicating a paging cycle, a first paging offset and a second paging offset, monitoring, by the M2M device in the idle mode, a transmission of a paging message at the first paging offset of the paging cycle, and if the paging message is not received at the first paging offset, monitoring, by the M2M device in the idle mode, the transmission of the paging message at the second paging offset of the paging cycle.

The paging configuration may be received via an Advanced Air Interface-Deregistration-Response (AAI-DREG-RSP) message.

The AAI-DREG-RSP message may be a response to an AAI-Deregistration-Request (AAI-DREG-REQ) message to be sent by the M2M device.

The paging configuration may include information about a paging group to which the M2M device is assigned.

The paging configuration may include information about a Fixed M2M Deregistration identifier (FMDID) that uniquely identifies the M2M device in domain of the base station during the idle mode.

In another aspect, a device for monitoring a paging message in machine-to-machine (M2M) communication is provided. The device includes a radio frequency (RF) unit configured to receive and transmit radio signals, and a processor operably coupled to the RF unit and configured to receive a paging configuration to initiate an idle mode from a base station, the paging configuration includes information indicating a paging cycle, a first paging offset and a second paging offset, monitor a transmission of a paging message at the first paging offset of the paging cycle, and if the paging message is not received at the first paging offset, monitor the transmission of the paging message at the second paging offset of the paging cycle.

In still another aspect, a device for transmitting a paging message in machine-to-machine (M2M) communication is provided. The device includes a radio frequency (RF) unit configured to receive and transmit radio signals, and a processor operably coupled to the RF unit and configured to transmit a paging configuration to allow a M2M device to initiate an idle mode, the paging configuration includes information indicating a paging cycle, a first paging offset and a second paging offset, transmit a paging message to the M2M device at the first paging offset of the paging cycle, and if a response to the paging message is not received from the M2M device, transmit the paging message to the M2M device at the second paging offset of the paging cycle.

In M2M communication, the delay of paging due to the missing of a paging message can be prevented.

DESCRIPTION OF EXEMPLARY EMBODIMENTS

Figure 1:
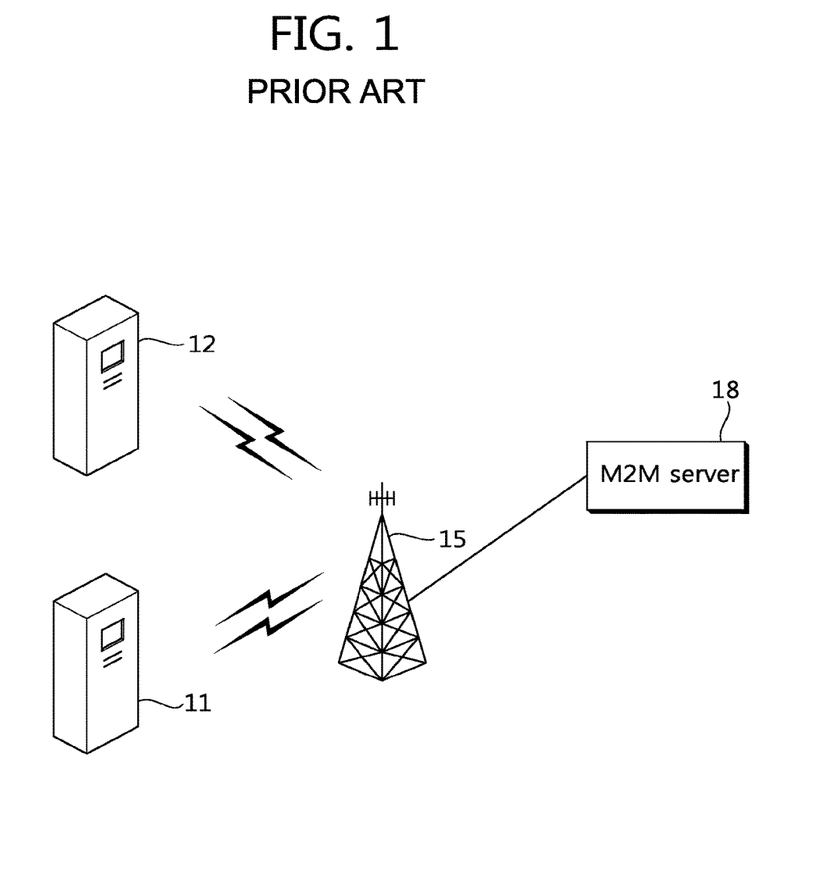
FIG. 1 shows an example of Machine-To-Machine (M2M) communication.

FIG. 1 shows an example of Machine-To-Machine (M2M) communication.

M2M communication is also called Machine Type Communication (MTC), and it refers to the exchange of pieces of information between M2M devices 11 and 12 through a base station 15 which is not accompanied by a human interaction or the exchange of pieces of information between the M2M device 11 and an M2M server 18 through the base station.

The M2M server 18 is an entity that communicates with the M2M device 11. The M2M server executes M2M applications and provides M2M-specific service to the M2M device 11.

The M2M device 11 is a wireless device that provides M2M communication, and it can be fixed or can have mobility. The M2M device is also called an MTC device.

Service provided through M2M communication is different from existing service in communication in which a person intervenes. The service includes various categories of service, such as tracking, metering, payment, medial service, and remote control.

Representative examples of the individual service requirements of an M2M feature are as follows.

1) A time-controlled feature: This means that an M2M device transmits or receives data only in a predetermined specific interval. Accordingly, unnecessary signaling outside the predetermined specific interval can be prevented.

2) A time-tolerant feature: This means that an M2M device can delay the transfer of data. A network operator can limit the access of an M2M device to a network or the transmission of data from an M2M device to another MTC device and dynamically limit the amount of data that can be transferred in a specific region by an MTC device, if a load of a network is greater than a predetermined load threshold.

3) An offline indication feature: This is to request notification from an M2M device in a proper time if signaling is no longer possible between the M2M device and a network.

4) A Priority Alarm Message (PAM) feature: This means that a network is first informed that theft, vandalism, or a state of emergency that requires immediate attention has occur in an M2M device.

The deployment of several hundred to several thousands of M2M devices in one cell (or base station) is taken into consideration. Accordingly, the following identifiers are taken into consideration because it is difficult to identify an M2M device using only existing terminal identifier.

A Station identifier (STID): It is an identifier to identify an M2M device in the domain of a base station. A base station can allocate the same STID to a plurality of M2M devices.

An M2M Group Identifier (MGID): This is an identifier used to uniquely identify an M2M device group in the region of a network entity that allocates an MGID.

An idle mode operation in an IEEE 802.16m-based system is described below with reference to Paragraph 16.2.18 of Institute of Electrical and Electronics Engineers (IEEE) P802.16m/D12 "Part 16: Air Interface for Broadband Wireless Access Systems: Advanced Air Interface" disclosed on Feb. 17, 2011. Here, a wireless communication system to which the present invention is applied is not limited to the IEEE 802.16m-based system, but can be applied to various wireless communication systems, such as 3rd Generation Partnership Project (3GPP) Long Term Evolution (LTE).

Figure 2:
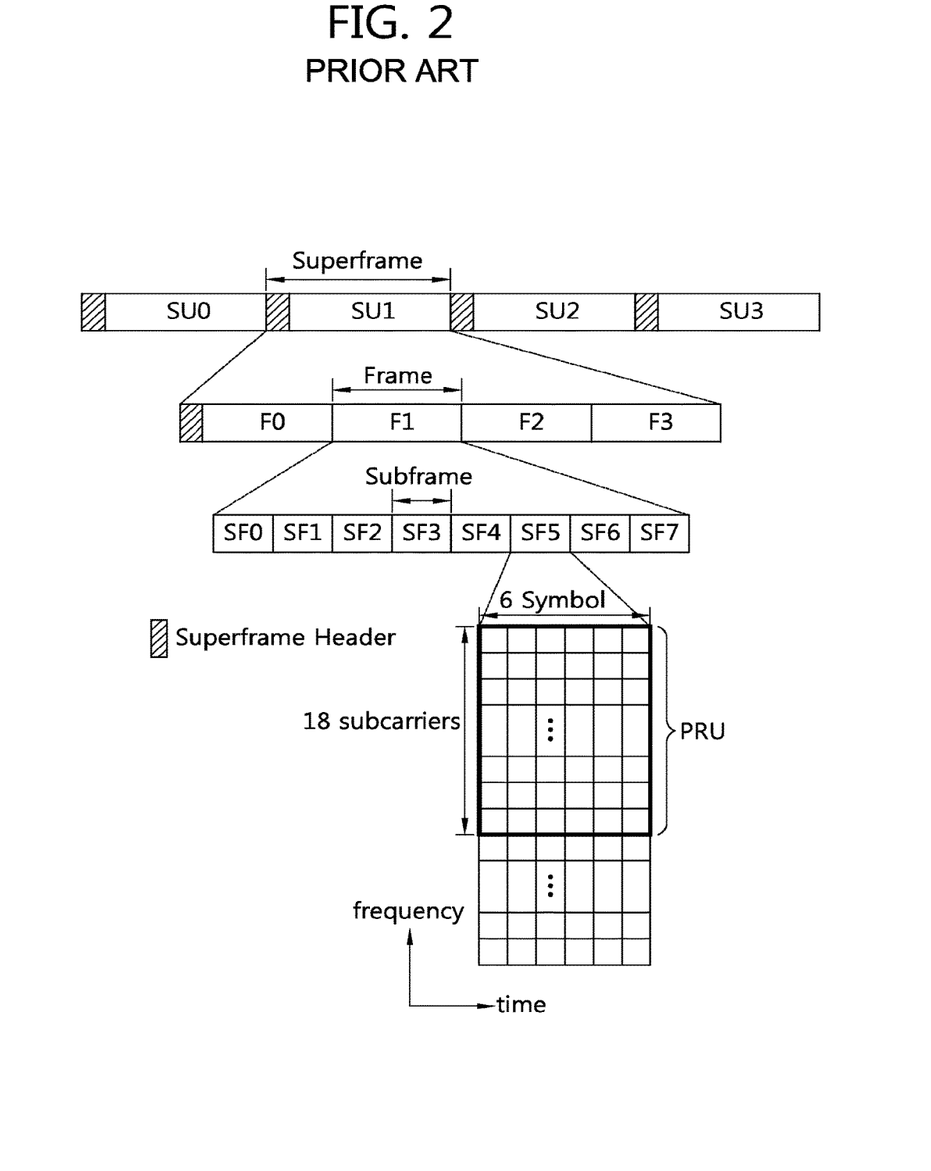
FIG. 2 shows an example of the frame structure of an IEEE 820.16m system.

FIG. 2 shows an example of the frame structure of an IEEE 820.16m system.

A superframe SF includes a superframe header (SFH) and 4 frames F0, F1, F2, and F3. The length of the frames within the superframe can be the same. The size of the superframe is 20 ms, and the size of each frame is 5 ms.

The frame includes a plurality of subframes SF0, SF1, SF2, SF3, SF4, SF5, SF6, and SF7. The subframes can be used for uplink transmission or downlink transmission. The subframe includes a plurality of Orthogonal Frequency Division Multiplexing (OFDM) symbols in the time domain. The OFDM symbol is for representing one symbol period, and a multi-access method is not limited by the name thereof.

The subframe includes 6 OFDM symbols. This is only an example. The subframe can include 5, 7, or 9 OFDM symbols, but not limited thereto.

The type of subframe can be defined by the number of OFDMA symbols included in the subframe. For example, Type-1 subframe can be defined to include 6 OFDMA symbols, Type-2 subframe can be defined to include 7 OFDMA symbols, Type-3 subframe can be defined to include 5 OFDMA symbols, and Type-4 subframe can be defined to include 9 OFDMA symbols.

A Time Division Duplex (TDD) scheme or a Frequency Division Duplex (FDD) scheme can be applied to the frame. Subframes in a TDD frame can be divided into uplink subframes and downlink subframes.

The size of a superframe, the number of frames included in the superframe, the number of subframes included in a frame, and the number of OFDM symbols included in a subframe can be changed, but not limited thereto.

The SFH can carry essential system parameters and system configuration information. The SFH can be transmitted in the last 5 OFDM symbols of the first subframe within a superframe.

A Physical Resource Unit (PRU) is a basic resource allocation unit, and it includes 18 subcarriers in the contiguous OFDM symbols of the same subframe.

In an IEEE 802.16 system, an advanced-MAP (A-MAP) carries service control information. A non-user-specific A-MAP carries information that is not limited to a specific user or a specific user group. A Hybrid Automatic Repeat Request (HARQ) feedback A-MAP carries HARQ ACK/NACK information for UL data transmission. A power control A-MAP carries a power control command to a Mobile Station (MS).

An assignment A-MAP carries resource allocation information. The assignment A-MAP includes several types, such as a downlink (DL) basic assignment A-MAP, an uplink (UL) basic assignment A-MAP, and a Code Division Multiple Access (CDMA) assignment A-MAP.

The CDMA assignment A-MAP includes UL resource allocation according to a bandwidth request or UL resource allocation according to a ranging request.

All A-MAPs share a physical resource region called an A-MAP region. The A-MAP region is present in each DL subframe.

Figure 3:
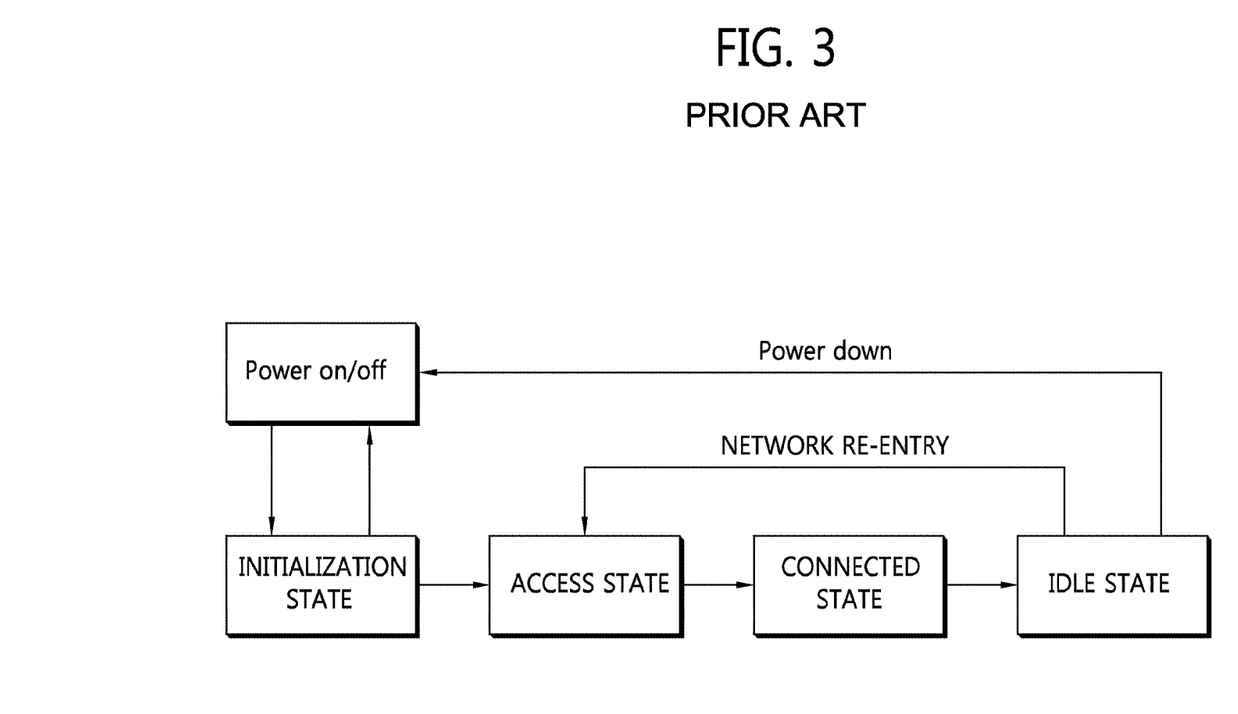
FIG. 3 shows an operation shift diagram in IEEE 802.16m.

FIG. 3 shows an operation shift diagram in IEEE 802.16m.

In an initialization state, a Mobile Station (MS) receives a synchronization and system configuration and performs cell selection.

In an access state, the MS performs network entry. The network entry is a procedure that includes ranging with a base station, basic capability negotiation, and authentication.

In a connected state, the MS operates in one of a sleep mode, an active mode, and a scanning mode. During the connected state, the MS maintains connection established during the access state. The MS in the active mode can always transmit or receive scheduled data. In the sleep mode, a radio frame is divided into a sleep window and a listening window. The MS in the sleep mode can receive data from a base station during the listening window. The MS in the scanning mode performs measurement indicated by a base station.

In the idle state, the MS operates in the idle mode. A base station can be allocated to one or more paging groups. An M2M device can be allocated to one or more paging groups. One paging cycle and one paging offset can be defined in each paging group. A paging cycle and a paging offset can be different between M2M devices allocated to the same paging group.

The paging cycle includes a paging-available interval and a paging-unavailable interval. A base station does not send any downlink traffic, such as a paging message, in the paging-unavailable interval. An M2M device monitors downlink traffic in the paging-available interval.

Figure 4:
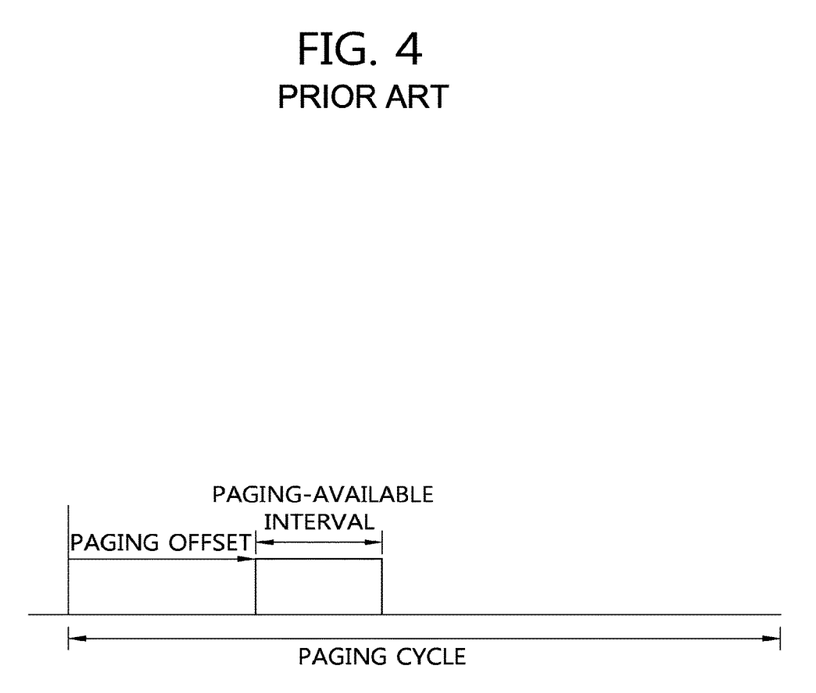
FIG. 4 shows an example of a paging cycle.

FIG. 4 shows an example of a paging cycle.

The start of a paging-available interval within a paging cycle is determined by a paging offset. The length of the interval of the paging-available interval can be predetermined.

Assuming that a paging cycle is defined in a superframe unit, a paging-available interval can be defined in a superframe number $N_{superframe}$ as follows.

$$N_{superframe} \bmod P_{cycle} = P_{offset} \quad \text{[Equation 1]}$$

Here, $P_{cycle}$ indicates a paging cycle, $P_{offset}$ indicates a paging offset, and 'mod' indicates modulo operation. The interval of a paging-available interval can be one superframe per paging cycle.

An M2M device requires small mobility and low power consumption according to the application. In order to reduce power consumption, a long paging cycle of several minutes to several hours can be set.

An M2M device in which a long paging cycle has been set may miss its paging message during a paging-available interval. A base station sends a paging message to an M2M device during a paging-available interval, but the M2M device does not receive the paging message due to channel conditions. The reception of a paging message by an M2M device can be delayed several hours due to a long paging cycle.

Figure 5:
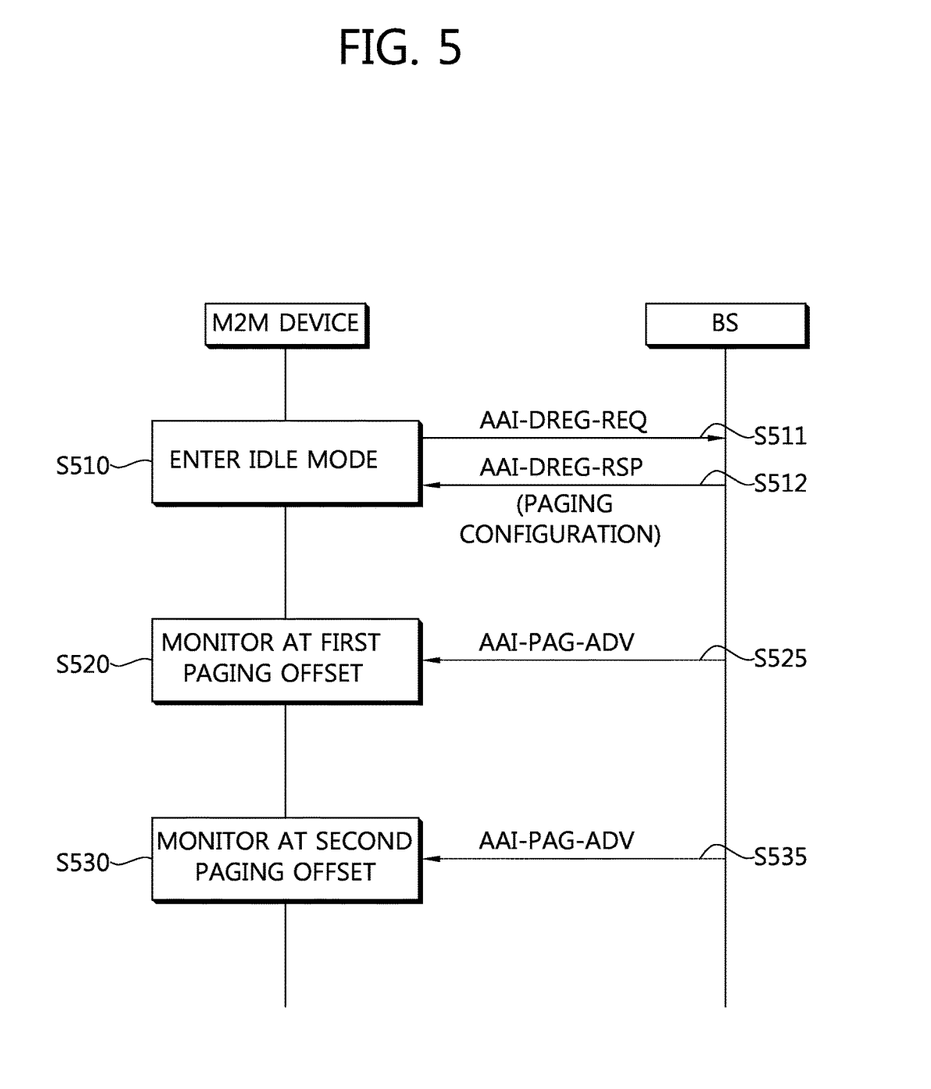
FIG. 5 shows a method of monitoring a paging message in accordance with an embodiment of the present invention.

FIG. 5 shows a method of monitoring a paging message in accordance with an embodiment of the present invention.

At step S510, an M2M device receives a paging configuration and enters an idle mode. The entry into the idle mode can be performed in response to a request from the M2M device or in response to a command from a base station.

An example in which the M2M device enters the idle mode is as follows. At step S511, the M2M device sends an Advanced Air Interface (AAI)-DREG-Deregistration-Request (REQ) message, requesting the entry into the idle mode, to the base station. At step S512, the M2M device receives an AAI-DREG-Deregistration-Response (RSP) message that permits the start of the idle mode from the base station. The AAI-DREG-RSP message can include a paging configuration.

For another example, the base station can instruct the M2M device to enter the idle mode by sending an AAI-DREG-Deregistration-Command (CMD) message to the M2M device. The AAI-DREG-CMD message can include a paging configuration.

For yet another example, the base station can send the AAI-DREG-RSP message, and the M2M device can enter the idle mode in response to the AAI-DREG-REQ message. The AAI-DREG-RSP message can include a paging configuration.

The paging configuration includes information about a paging cycle, a first paging offset, and a second paging offset. In accordance with a proposed embodiment, at least two paging offsets are defined in the idle mode.

The format of the AAI-DREG-RSP message including the paging configuration according to a proposed embodiment is described later.

Figure 6:
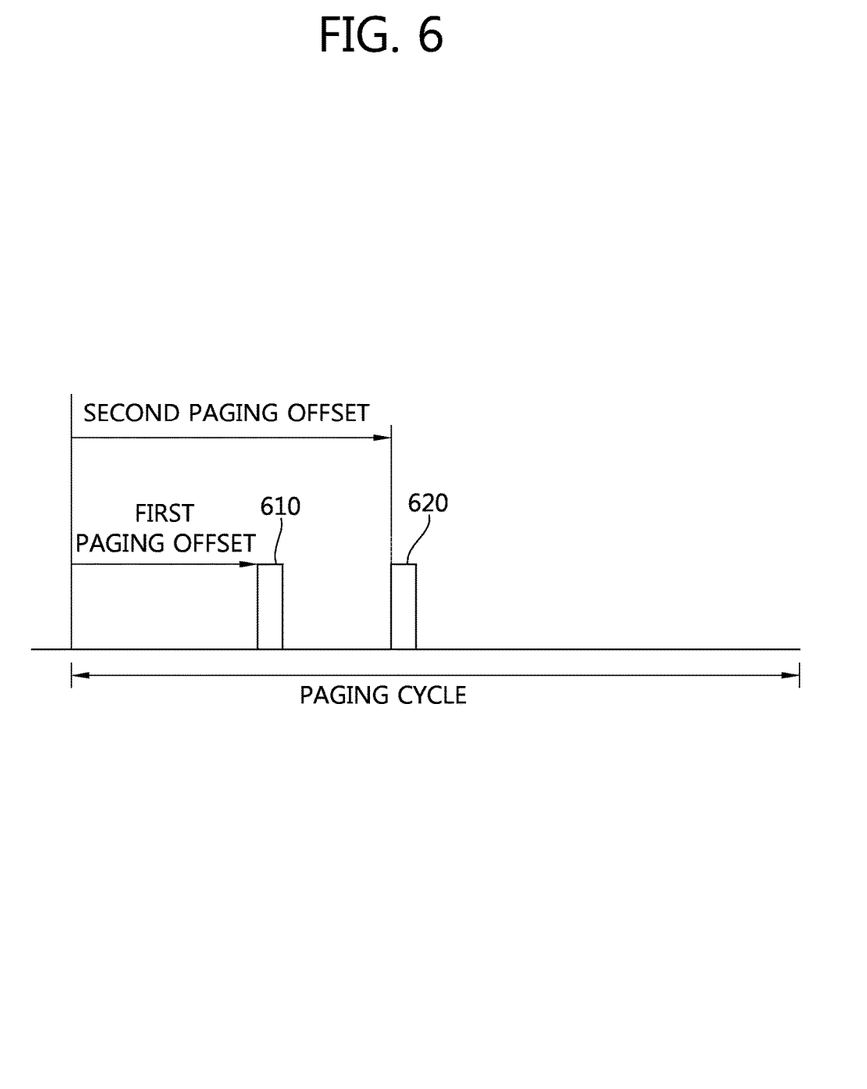
FIG. 6 shows a paging cycle in accordance with an embodiment of the present invention.

FIG. 6 shows a paging cycle in accordance with an embodiment of the present invention.

A first paging-available interval 610 is defined by a first paging offset within a paging cycle, and a second paging-available interval 620 is defined by a second paging offset within the paging cycle. The length of the first paging-available interval 610 can be the same as that of the second paging-available interval 620.

Assuming that the paging cycle is defined in a superframe unit, the first paging-available interval 610 and the second paging-available interval 620 can be defined in a superframe number $N_{superframe}$ as follows.

$$N_{superframe} \bmod P_{cycle} = P_{offset1} \text{ or } P_{offset2} \quad \text{[Equation 2]}$$

Here, $P_{cycle}$ indicates the paging cycle, $P_{offset1}$ is the first paging offset, and $P_{offset2}$ is the first paging offset. The size of each of the first and the second paging-available intervals can be one superframe per paging cycle.

The start point of the first paging offset and the start point of the second paging offset are illustrated as being the same, but this is only an example. The start point of the second paging offset can be a point at which the first paging offset is ended (i.e., the start point of the first paging-available interval 610). Or, the start point of the second paging offset can be the end point of the first paging-available interval 610.

Referring back to FIG. 5, at step S520, in the idle mode, the M2M device monitors the transmission of a paging message in the first paging offset. The M2M device determines the start of the first paging-available interval based on the first paging offset and monitors the transmission of a paging message during the first paging-available interval. The base station can send the paging message during the first paging-available interval. The paging message is a notification message indicating whether or not pending downlink traffic is present in a specific device. The paging message can be an AAI-PAG-paging advertisement (ADV) message. For example, at step S525, the base station can send the AAI-PAG-ADV message during the first paging-available interval. The AAI-PAG-ADV message can instruct the M2M device to perform network re-entry.

At step S530, if a paging message is not received in the first paging offset, the M2M device monitors the transmission of a paging message in the second paging offset. The M2M device determines the start of the second paging-available interval based on the second paging offset and monitors the transmission of a paging message during the second paging-available interval. At step S535, if the base station does not receive any response from the M2M device after sending the AAI-PAG-ADV message during the first paging-available interval, the base station sends the AAI-PAG-ADV message again during the second paging-available interval.

If the AAI-PAG-ADV message is received, the M2M device terminates the idle mode and initiates a network re-entry process.

If a paging message is not received in the second paging offset, the M2M device can send an AAI-ranging-request (RNG-REQ) message to the base station. The AAI-RNG-REG message can include a ranging purpose indicator indicative of location update in the idle mode in which a paging message is requested. In response to the AAI-RNG-REG message, the base station can send an AAI-RNG-ranging-response (RSP) message to the M2M device. The AAI-RNG-RSP message can include parameters within the paging message within the first and the second paging-available intervals which has been transmitted by the base station.

Even in the conventional IEEE 802.16m system, a plurality of paging offsets can be allocated to an MS. However, the plurality of paging offsets allocated to an MS is different from a plurality of paging offsets according to a proposed embodiment as follows.

A paging offset in IEEE 802.16m is mapped to a paging group in a 1:1 way. If a plurality of paging groups is allocated, a plurality of paging offsets is allocated. Furthermore, one paging offset is included in one paging cycle. For example, if an MS is allocated to two paging groups (they are called a primary paging group and a secondary paging group), a primary paging offset and a primary paging cycle corresponding to the primary paging group and a second paging offset and a secondary paging cycle corresponding to the secondary paging group are allocated. If the MS deviates from the region of the first paging group and moves to the region of the secondary paging group, the MS monitors a paging message in the second paging offset.

In contrast, the plurality of proposed paging offsets is not related to the number of allocated paging groups. Furthermore, a plurality of paging offsets is defined within one paging cycle, and a plurality of paging-available intervals is present within one paging cycle.

The format of an AAI-DREG-RSP message including a proposed paging configuration is described below. The AAI-DREG-RSP message is only an example. The paging configuration can be included in another message other than the AAI-DREG-RSP message and transmitted.

In the following table, field names, sizes, and field values are only exemplary, and those skilled in the art can easily change the field names, the sizes, and the field values into other names and other values.

Table 1 below shows an example of fields included in the AAI-DREG-RSP message in accordance with an embodiment of the present invention.

TABLE 1

| FIELD NAME | SIZE (BITS) | DESCRIPTION |
| --- | --- | --- |
| Paging cycle | 4 | Indicate a paging cycle |
| First paging offset | 12 | Indicate a first paging offset |
| Second paging offset | 12 | Indicate a second paging offset |
| Localized idle mode flag | 1 | 0b0: An M2M device enters a normal idle mode<br>0b1: An M2M device enters a localized idle mode |

TABLE 1-continued

| FIELD NAME | SIZE (BITS) | DESCRIPTION |
| --- | --- | --- |
| Paging group ID | 16 | Indicate a paging group to which an M2M device belongs. Present when a localized idle mode flag==0b0 |
| Deregistration ID (DID) | 18 | An identifier to identify an M2M device in the normal idle mode. Present when a localized idle mode flag==0b0 |
| FMDID | 18 | An identifier to identify an M2M device in the localized idle mode. Present when a localized idle mode flag==0b1 |

The normal idle mode and the localized idle mode differ depending on whether an M2M device is identified by a paging group ID and a DID or identified by an FMDID.

In the following message formats, a localized idle mode flag, a paging group ID, a DID, and an FMDID can be included in or omitted from a corresponding message.

A Long Paging Cycle (LPC) indicator that indicates whether or not an M2M device has a long paging cycle (or whether or not a plurality of paging offsets is allocated) can be included in a paging configuration. The following table shows the format of an AAI-DREG-RSP message having an LPC indicator and 3 paging offsets.

TABLE 2

| FIELD NAME | SIZE (BITS) | DESCRIPTION |
| --- | --- | --- |
| Paging cycle | 4 | Indicate a paging cycle |
| First paging offset | 12 | Indicate a first paging offset |
| LPC indicator | 1 | 0b0: one paging offset is used<br>0b1: two or more paging offsets are used |
| if (LPC indicator== 0b01) { | | |
| Second paging offset | 12 | Indicate a second paging offset |
| Second paging offset | 12 | Indicate a third paging offset |
| } | | |

If 3 paging offsets are set, an M2M device operates as follows. In an idle mode, the M2M device monitors the transmission of a paging message in a first paging offset. If a paging message is not received in the first paging offset, the M2M device monitors the transmission of a paging message in a second paging offset. If a paging message is not received in the second paging offset, the M2M device monitors the transmission of a paging message in a third paging offset.

Or, in order to set a plurality of paging offsets, an AAI-DREG-RSP message can be configured as in the following table.

TABLE 3

| FIELD NAME | SIZE (BITS) | DESCRIPTION |
| --- | --- | --- |
| Paging cycle | 4 | Indicate a paging cycle |
| First paging offset | 12 | Indicate a first paging offset |
| LPC indicator | 1 | 0b0: one paging offset is used<br>0b1: two or more paging offsets are used |
| if (LPC indicator == 0b01) { | | |
| Second paging offset | 12 | Indicate a second paging offset |
| Retry count | 2 | Indicate the number of second paging offsets |
| } | | |

For example, if a value of the retry count is 3, the second paging offset is repeated up to three times. In an idle mode, an M2M device monitors the transmission of a paging message in a first paging offset. If a paging message is not received in the first paging offset, the M2M device monitors the transmission of a paging message in a first second paging offset. If a paging message is not received in the first second paging offset, the M2M device monitors the transmission of a paging message in a second second paging offset. If a paging message is not received in the second second paging offset, the M2M device monitors the transmission of a paging message in a third second paging offset. If a paging message is not received in the third second paging offset, the M2M device returns to a paging-unavailable interval.

For another example, an AAI-DREG-RSP message can be configured as in the following table.

TABLE 4

| FIELD NAME | SIZE (BITS) | DESCRIPTION |
| --- | --- | --- |
| Paging cycle | 4 | Indicate a paging cycle |
| First paging offset | 12 | Indicate a first paging offset |
| Second paging offset | 12 | Indicate a second paging offset |
| Retry count | 2 | Indicate the number of second paging offsets |

If a value of the retry count is 0, the second paging offset is not used.

Figure 7:
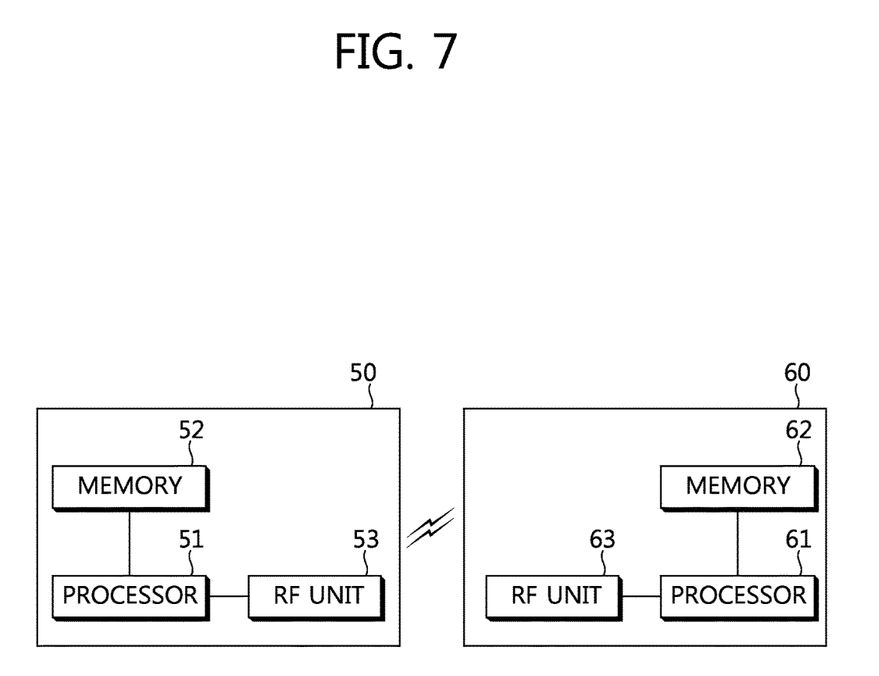
FIG. 7 is a block diagram showing a wireless communication system in which an embodiment of the present invention is implemented.

FIG. 7 is a block diagram showing a wireless communication system in which an embodiment of the present invention is implemented.

An MTC device 50 includes a processor 51, memory 52, and a Radio Frequency (RF) unit 53. The memory 52 is connected to the processor 51 and stores various pieces of information for driving the processor 51. The RF unit 53 is connected to the processor 51 and transmits and/or receives radio signals. The processor 51 implements the proposed functions, processes and/or methods. In the aforementioned embodiment of FIG. 5, the operations of the MTC device can be implemented by the processor 51.

A base station 60 includes a processor 61, memory 62, and an RF unit 63. The memory 62 is connected to the processor 61 and stores various pieces of information for driving the processor 61. The RF unit 63 is connected to the processor 61 and transmits and/or receives radio signals. The processor 61 implements the proposed functions, processes and/or methods. In the aforementioned embodiment of FIG. 5, the operations of the base station can be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for monitoring a paging message in machine-to-machine (M2M) communication, the method comprising:
   receiving, by a M2M device, a paging configuration from a base station to initiate an idle mode, the paging configuration includes a Long Paging Cycle (LPC) indicator indicating whether or not the M2M device has a long paging cycle and a paging offset;
   determining whether the M2M device has the long paging cycle,
   wherein the paging configuration further includes an additional paging offset when it is determined that the M2M device has only the long paging cycle of several minutes to several hours;
   monitoring, by the M2M device in the idle mode, a transmission of a paging message at the paging offset of the paging cycle; and
   monitoring, by the M2M device in the idle mode, the transmission of the paging message at the additional paging offset of the paging cycle when the paging message is not received at the paging offset,
   wherein the paging cycle is determined in units of superframes, and
   wherein a start of a paging available interval is determined by the paging offset.

2. The method of claim 1, wherein the step of monitoring the transmission of the paging message at the paging offset of the paging cycle includes: monitoring the transmission of the paging message during the paging available interval.

3. The method of claim 1, wherein the paging configuration is received via an Advanced Air Interface-Deregistration-Response (AAI-DREG-RSP) message.

4. The method of claim 3, wherein the AAI-DREG-RSP message is a response to an AAI-Deregistration-Request (AAI-DREG-REQ) message.

5. The method of claim 1, wherein the paging configuration includes information about a paging group to which the M2M device is assigned.

6. The method of claim 1, wherein the paging configuration includes information about a Fixed M2M Deregistration identifier (FMDID) that uniquely identifies the M2M device in domain of the base station during the idle mode.

7. The method of claim 1, further comprising: terminating, by the M2M device, the idle mode upon receiving the paging message.

8. The method of claim 1, wherein when the paging cycle for monitoring the paging message exceeds a certain number of superframes, it is determined that the M2M device will have the long paging cycle.

9. A device for monitoring a paging message in machine-to-machine (M2M) communication, comprising:
   a radio frequency (RF) unit that receives and transmits radio signals; and
   a processor, operably coupled to the RF unit, that:
   controls the RF unit to receive a paging configuration from a base station to initiate an idle mode, the paging configuration includes a Long Paging Cycle (LPC) indicator indicating whether or not the M2M device has a long paging cycle and a paging offset;

determines whether the M2M device has a long paging cycle, wherein the paging configuration further includes an additional paging offset when it is determined that the device has only the long paging cycle of several minutes to several hours;

monitors a transmission of a paging message at the paging offset of the paging cycle; and monitors the transmission of the paging message at the additional paging offset of the paging cycle when the paging message is not received at the paging offset, wherein the paging cycle is determined in units of superframes, and wherein a start of a paging available interval is determined by the paging offset.

10. The device of claim 9, wherein the processor monitors the transmission of the paging message at the paging offset of the paging cycle by: monitoring the transmission of the paging message during the paging available interval.

11. The device of claim 9, wherein the paging configuration is received via an Advanced Air Interface-Deregistration-Response (AAI-DREG-RSP) message.

12. The device of claim 11, wherein the AAI-DREG-RSP message is a response to an AAI-Deregistration-Request (AAI-DREG-REQ) message.

13. The device of claim 9, wherein the paging configuration includes information about a paging group to which the device is assigned.

14. The device of claim 9, wherein the paging configuration includes information about a Fixed M2M Deregistration identifier (FMDID) that uniquely identifies the device in domain of the base station during the idle mode.

15. The device of claim 9, wherein when the paging cycle for monitoring the paging message exceeds a certain number of superframes, it is determined that the M2M device will have the long paging cycle.

16. A device for transmitting a paging message in machine-to-machine (M2M) communication, comprising:
   a radio frequency (RF) unit that receives and transmits radio signals; and
   a processor, operably coupled to the RF unit, that:
   controls the RF unit to transmit a paging configuration to allow a M2M device to initiate an idle mode, the paging configuration includes a Long Paging Cycle (LPC) indicator indicating whether or not the M2M device has a long paging cycle and a paging offset;
   determines whether the M2M device has a long paging cycle,
   wherein the paging configuration further includes an additional paging offset when it is determined that the device has only the long paging cycle of several minutes to several hours;
   controls the RF unit to transmit a paging message to the M2M device at the paging offset of the paging cycle; and
   controls the RF unit to transmit the paging message to the M2M device at the additional paging offset of the paging cycle when the paging message is not received at the paging offset,
   wherein the paging cycle is determined in a unit of superframe, and
   wherein a start of paging available interval is determined by the paging offset.

17. The device of claim 16, wherein the paging message indicates that the M2M device performs network reentry.

* * * * *